Patented Jan. 5, 1932

1,839,529

UNITED STATES PATENT OFFICE

LEAVITT N. BENT, OF HOLLY OAK, DELAWARE, ASSIGNOR TO HERCULES POWDER COMPANY, OF WILMINGTON, DELAWARE, A CORPORATION OF DELAWARE

QUICK DRYING LACQUER

No Drawing. Application filed March 22, 1927. Serial No. 177,467.

My invention relates to an improvement in lacquers and more particularly to those lacquers including as an ingredient nitrocellulose or nitrostarch.

The object of my invention is to produce a quick drying lacquer of superior qualities.

My invention involves the inclusion in nitrocellulose or nitrostarch lacquers of an alkyl, aryl or dihydric alcohol abietate, for example, an alkyl or an aryl ester of abietic acid, such, for example, as ethyl, propyl, amyl, butyl, etc. abietates, the abietic salts of ring compounds, such as benzyl abietate, phenyl abietate, etc., and also dihydric alcohol abietates, such as glycol abietate all of which characteristically have substantial fluidity or in other words, are fluids or semisolids.

The lacquer embodying my invention may include, in addition to nitrocellulose or nitrostarch and an alkyl or aryl abietate, those ingredients such as are usually found in such lacquers, as, for example, gums, plasticizers, solvents, diluents, etc.

As an example of a nitrocellulose lacquer including ethyl abietate and embodying my invention the following will be illustrative:—

Formula No. 1

| | Per cent |
|---|---|
| Soluble nitrocotton | 12.0 |
| Denatured alcohol | 5.0 |
| Butyl acetate | 26.5 |
| Ethyl acetate | 6.0 |
| Butanol | 5.0 |
| Toluol | 26.0 |
| Gum damar solution | 9.5 |
| Ethyl abietate | 10.0 |

Formula No. 2

| | Per cent |
|---|---|
| Soluble nitrocotton | 10.5 |
| Denatured alcohol | 4.5 |
| Butyl acetate | 26.5 |
| Ethyl acetate | 6.0 |
| Butanol | 5.0 |
| Toluol | 26.0 |
| Plasticizer | 5.0 |
| Ethyl abietate | 16.5 |

As an example of a nitrostarch lacquer including ethyl abietate and embodying my invention, the following will be illustrative:—

Formula No. 3

| | Per cent | |
|---|---|---|
| Low viscosity nitrostarch | 40 | |
| Benzol | 10 | |
| Butyl acetate | 10 | |
| Butanol | 4 | |
| Denatured alcohol | 5 | |
| Ester gum solution | 15 | (45% gum 55% toluol) |
| Toluol | 4 | |
| Ethyl abietate | 12 | |

The abietates for use in accordance with my invention may be prepared in any well known manner as, for example, from the silver salt of abietic acid and ethyl iodide, dimethyl sulphate and sodium abietate, the acid chloride and alcohol, or by refluxing an alcoholic solution with sulphuric acid. The alkyl esters of abietic acid may also be prepared from wood rosin, permissibly a brown wood rosin, by the process described in the application for patent of Alan C. Johnston, Serial No. 125,833, filed July 29, 1926, which consists in refluxing the rosin with a solution of caustic alkali diluted with alcohol until a clear solution is obtained, then adding an alkyl sulphate and distilling off the alcohol, and finally distilling off the ester from the residue under vacuum.

The alkyl or aryl abietate when included in nitrocellulose lacquers act in some instances partially as plasticizers, since they have a slow colloiding action on nitrocellulose and partially as gums, while in other instances they act merely as gums.

When an alkyl or aryl abietate is included in a nitrocellulose or nitrostarch lacquer, the lacquer is quick drying, of superior quality and produces a superior film and the abietates will withstand heat better than a so called ester gum or damar gum.

It will be understood that my invention is equally applicable to nitrocellulose and to nitrostarch lacquers and that when in the claims appended hereto I refer to nitrocellulose lacquers, I intend to include nitrostarch lacquers as equivalents.

Having now fully described my invention, what I claim and desire to protect by Letters Patent is:—

1. A nitrocellulose lacquer including as an ingredient an alkyl abietate prepared from wood rosin.

2. A nitrocellulose lacquer including as an ingredient an alkyl abietate prepared from rosin and a monohydric alcohol.

3. A nitrocellulose lacquer including as an ingredient ethyl abietate.

4. A nitrocellulose lacquer including as an ingredient an alkyl abietate prepared from rosin and a monohydric aliphatic alcohol.

5. A nitrocellulose lacquer including as an ingredient methyl abietate.

6. A nitrocellulose lacquer including as an ingredient butyl abietate.

In testimony of which invention, I have hereunto set my hand, at Wilmington, Del., on this 14th day of March, 1927.

LEAVITT N. BENT.